Patented Feb. 2, 1954

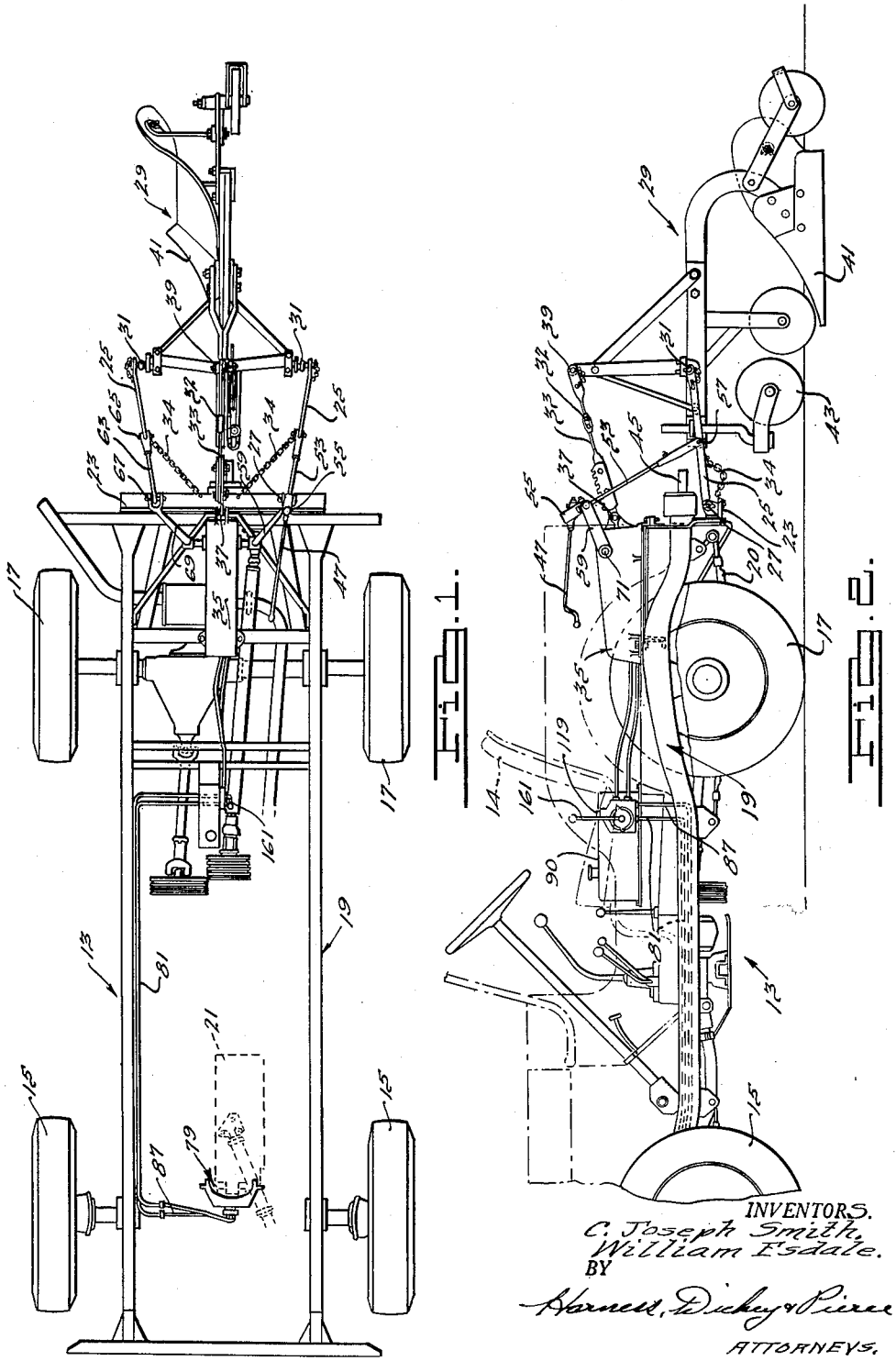

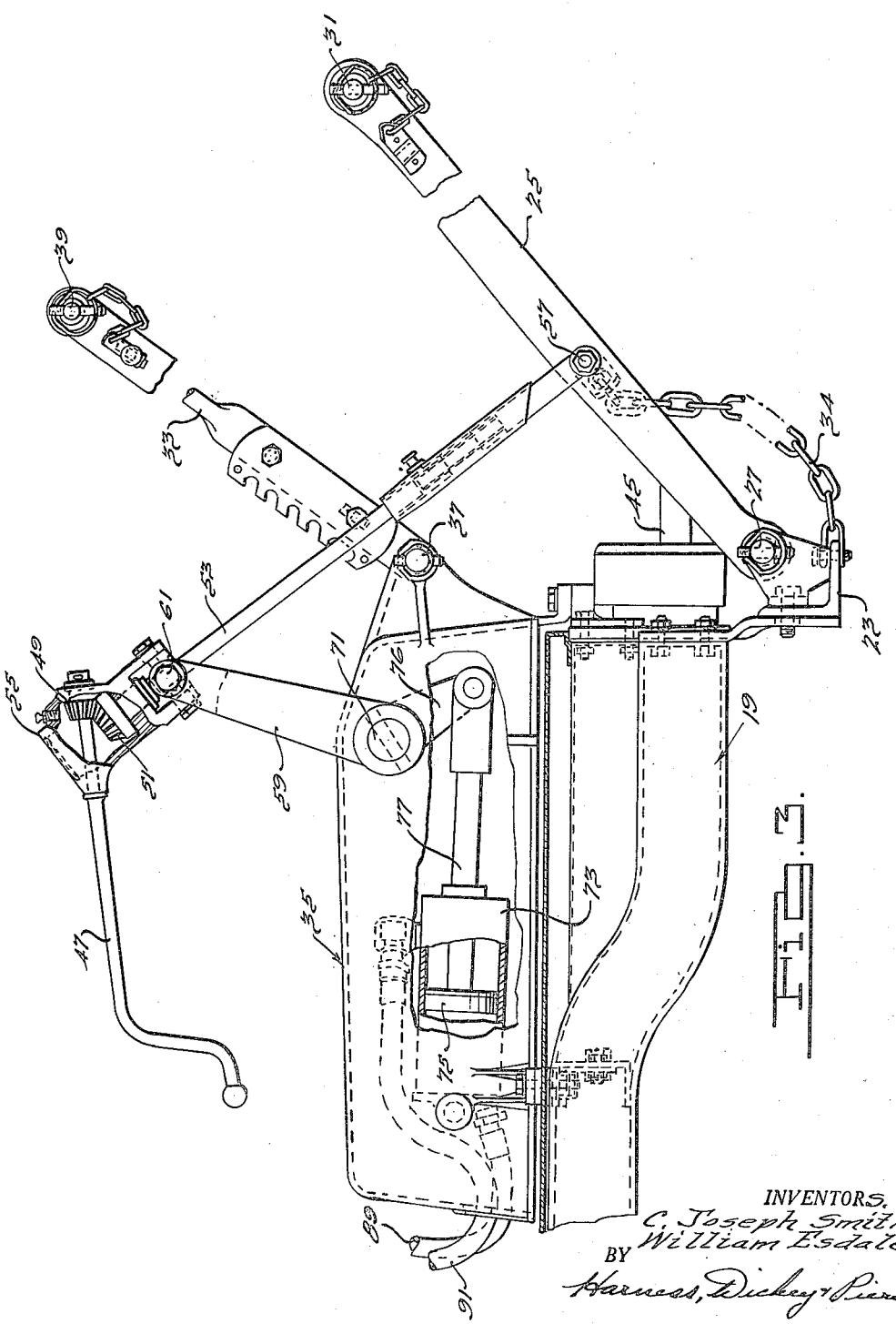

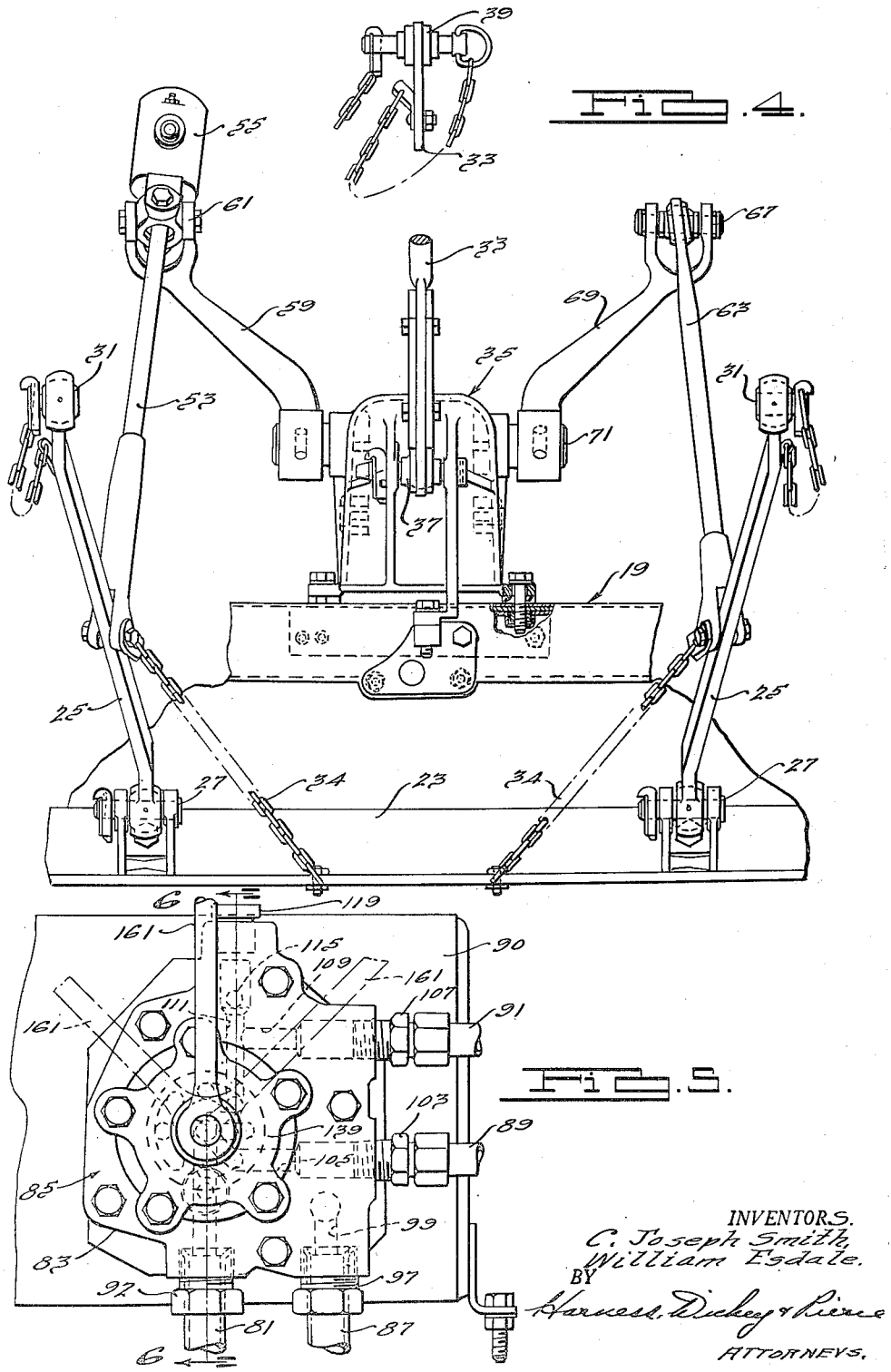

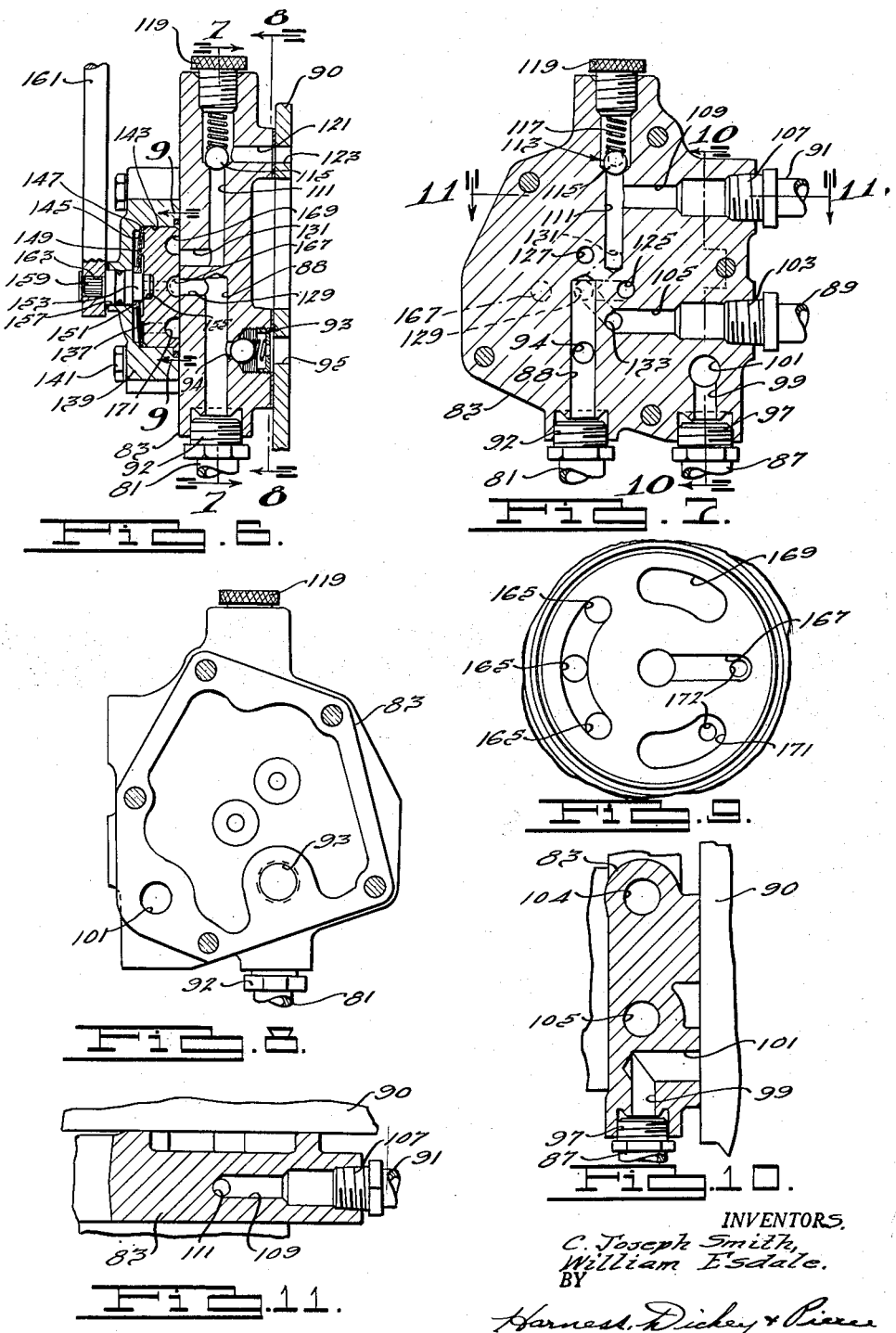

2,667,745

UNITED STATES PATENT OFFICE 2,667,745

CONTROL VALVE FOR FLUID OPERATED LIFTS

Charles Joseph Smith and William Esdale, Monroe, Mich., assignors to Monroe Auto Equipment Company, Monroe, Mich., a corporation of Michigan Application February 14, 1948, Serial No. 8,444

2 Claims. (Cl. 60—52)

This invention relates generally to a device for operatively connecting an agricultural implement or the like to a vehicle, and more particularly to a device including hitch links and a power-operated lift unit, by means of which various types of agricultural or soil working implements may be attached to a vehicle so as to operate in a more simple and efficient manner than has heretofore been possible.

It is an object of this invention to provide a device of the aforementioned type by means of which agricultural implements, such as plows, may be universally attached to a vehicle so as to be free to swing laterally and effectively follow the steering of the vehicle, and at the same time plow or work the ground at a substantially constant depth regardless of the terrain over which the vehicle and implement are operating.

It is a further object of this invention to provide a device of the aforementioned type which permits the operator of the vehicle to raise or lower the implement without moving from his seat, and also to apply a predetermined and adjustable downward pressure on the implement which is especially advantageous with certain types of agricultural implements such as cultivators, power-operated saws, post hole diggers and the like.

It is a further object of this invention to provide a device of the aforementioned type, in which the lift unit is hydraulically operated from the vehicle power plant, and which is so constructed that the agricultural implement may be raised off of the ground and locked in a raised position while the vehicle power plant and lift unit pump are still in operation.

It is a still further object of this invention to provide a device of the aforementioned type which can be arranged so as to permit the hitch links to vertically float about their vehicle connection points, and which either incorporates an adjustable link or is used with an agricultural implement having a depth control wheel, which can be connected to the vehicle, by means of the hitch links, in such a manner that the depth of soil working of the implement will be completely controlled without regard to the relative position or relationship between the vehicle and implement by either the adjusted link or the depth control wheel whichever the case may be.

It is a still further object of this invention to provide a device of the aforementioned type which is especially compact in arrangement, rugged in construction, efficient in operation, and in which the primary moving or operating parts are sufficiently housed so as to prevent the ingress of dirt or the like which might hinder their operation.

It is a still further object of this invention to provide a device of the aforementioned type in which the hitch links are so arranged and constructed that they will prevent a connected implement from overturning when it is working the soil, while at the same time transmitting the load from the implement to the vehicle ground-engaging wheels so as to insure the most efficient operating conditions.

It is a still further object of this invention to provide an improved valve in the power-operated lift unit which permits the hitch links and a connected implement to be controlled by the driver of the vehicle through the operation of a hand lever so that the aforementioned various hitch link positions may be easily obtained.

It is a still further object of this invention to provide a device of the aforementioned type including a valve arrangement which permits the downward pressure, applied to the hitch links through the power-operated lift unit, to be varied so that various predetermined downward pressures can be exerted on the implement in accordance with various operating conditions and various types of implements being used.

It is a still further object of this invention to provide a device of the aforementioned type which is relatively inexpensive to manufacture, simple to attach to a vehicle and to an implement, and which is adapted for use with a wide variety of agricultural implements so as to insure the most efficient operation of these implements.

These and other objects of this invention will become apparent from the following detailed description taken in conjunction with the accompanying drawings in which, Figure 1 is a top plan view illustrating the device of this invention connecting an agricultural plow to a four-wheel vehicle of the "jeep" type;

Fig. 2 is a fragmentary, side elevational view of the structure illustrated in Fig. 1;

Fig. 3 is an enlarged fragmentary, side elevational view of the device of this invention connected to the rear portion of a vehicle, with parts broken away for purposes of clarity;

Fig. 4 is a rear elevational view of the structure illustrated in Fig. 3;

Fig. 5 is an enlarged fragmentary side elevational view of a portion of the structure illustrated in Fig. 2 and showing a portion of the fluid reservoir tank with the valve body and operating handle mounted thereon;

Fig. 6 is a sectional view of the structure illus-

Fig. 7 is a sectional view of the structure illustrated in Fig. 5 taken along the line 6—6 thereof;

Fig. 7 is a sectional view of the structure illustrated in Fig. 6 taken along the line 7—7 thereof;

Fig. 8 is a sectional view of the structure illustrated in Fig. 6 taken along the line 8—8 thereof;

Fig. 9 is a view of a portion of the structure illustrated in Fig. 6 taken along the line 9—9 thereof;

Fig. 10 is a fragmentary sectional view of a portion of the structure illustrated in Fig. 7 taken along the line 10—10 thereof; and Fig. 11 is a sectional view of the structure illustrated in Fig. 7 taken along the line 11—11 thereof.

Referring now to the drawings, and more particularly to Figs. 1 through 3, it will be seen that 13 indicates a "jeep"-type vehicle having front ground-engaging wheels 15, rear ground-engaging wheels 17, and a chassis frame 19 conventionally supported on the wheels through springs 20. The vehicle 13 is provided with a suitable power plant or engine 21 for driving the vehicle in either two, or four-wheel drive. A hitch bar 23 is connected to the rear portion of the vehicle chassis frame 19, and the forward ends of a pair of forwardly converging hitch links 25 are universally connected to the hitch bar at 27. The rear ends of the hitch links 25 are universally connected to an agricultural implement, shown in the form of an agricultural plow 29, at 31. An upper compression hitch link 33 has its forward end universally connected to the rear portion of a housing 35, which is mounted on the vehicle chassis frame 19, at 37, and the rear end of the link 33 is universally connected to the implement 29, at 39. The link 33 includes a turnbuckle 32 so that the length thereof may be adjusted for reasons which will hereinafter appear. The upper link 33 is disposed in a vertical plane lying between the vertical planes of the lower links 25 so that a triangularly spaced link arrangement is provided by means of which any suitable agricultural or soil working implement may be connected to the rear portion of the vehicle 13.

The lower links 25 forwardly converge so as to have an imaginary convergent point forwardly of their actual connection to the hitch bar 23. In this way the implement will swing laterally in such a manner as to efficiently follow the steering of the vehicle 13. Chains 34 are connected between the vehicle and links 25 to prevent excess lateral movement of the links. The upper compression link 33 acts to prevent overturning of the implement 29, when the latter is being pulled by the vehicle, and it converges forwardly with respect to the lower links 25 so as to transmit the load from the implement to the vehicle wheels in the most efficient manner. In the construction herein illustrated, approximately 40 per cent of the load from the plow is transmitted to the vehicle front wheels 15, while approximately 60 per cent of the load is transmitted to the vehicle rear wheels 17. In this way the load from the implement is efficiently transmitted to the vehicle 13, through the hitch links, so that the maximum pulling efficiency is obtained and so that the ground-engaging wheels 15 and 17 will have as little tendency to slip, with respect to the ground, as possible. The device of this invention is adapted, as will hereinafter appear, to apply various down pressures on the implement so as to eliminate the need of weighting the implement, and the hitch link arrangement permits the load to be varied between the vehicle front and rear ground-engaging wheels so that even if, for example, the rear wheels should tend to lift and slip, the driven front ground-engaging wheels will absorb more of the load and the implement will still be efficiently drawn by the vehicle 13.

The implement 29, illustrated in the drawings, is of a suitable plow-type and is provided with a plow blade 41 which, when being drawn along the ground, will, due to its construction, dig into the soil. The operating depth of the plow blade 41 is controlled either by adjusting the turnbuckle 32 so as to vary the length of the upper hitch link 33 or by means of a depth control wheel 43 which is provided on the plow in a manner well-known in the art. Either the adjustable link 33 or the depth control wheel 43 completely controls the depth of the plow blade 41 regardless of the type of soil or of the relative relationship between the vehicle 13 and the implement 29. While both the depth control wheel 43 and the adjustable turnbuckle 32 are shown in the drawings, only one or the other need actually be used as a depth control mechanism.

The vehicle 13 is provided with a power take-off 45 which projects beyond the rear end of the vehicle 13 within the confines of the vertical planes of the triangularly spaced hitch links 25 and 33. The power take-off 45 is operatively connected to the vehicle power plant 21 in a conventional manner so that it may be driven by the power plant regardless of whether or not the vehicle ground-engaging wheels are being driven. The power take-off 45 is adapted for use with various types of agricultural implements, such as post hole diggers, power-operated saws, and other implements employing elements to be driven. Thus various types of agricultural implements may be connected to the vehicle 13 by the hitch links, and it is to be distinctly understood that the device of this invention is not limited exclusively to use with a plow, such as illustrated in the drawings, but is adapted equally as well for use with various other types of agricultural implements.

As can be best seen in Figs. 2 and 3, the lower hitch links 25 may be located in different horizontal planes with respect to each other, which is desirable when operating over certain types of terrain, such as on the side of a hill. The adjustment of one of the links 25 is accomplished by means of an operating handle 47 having a bevel gear 49 on the inner end thereof which meshes with a complemental bevel gear 51 on the upper end of a rod 53. The gears 49 and 51 are enclosed within a housing 55 so as to prevent the ingress of dirt or the like which might hinder the operation of the same. The lower end of the rod 53 is pivotally connected to one of the lower hitch links 25, at 57, so that by rotating the operating handle 47 one of the links 25 can be adjusted vertically with respect to the other link, as determined by the terrain being worked.

The housing 55 and the upper end of the rod 53 are universally connected to a rearwardly and downwardly extending link 59, at 61. The opposite lower hitch link 25 has the lower end of a rod 63, which is generally similar to the rod 53, pivotally connected thereto at 65. The upper end of the rod 63 is universally connected at 67 to the upper and forward end of a link 69, which is similar to the link 59, previously described. The lower ends of the links 59 and 69 are rigidly connected to the opposite ends of a shaft 71, which extends transversely through, and is journaled in, the housing 35, adjacent the rear end thereof.

A cylinder 73 is mounted on the vehicle chassis frame 19, within the confines of the housing 35. A bore fitting piston 75 is slidably disposed in the cylinder 73. The piston 75 is provided with a piston rod 77, which projects rearwardly through the end wall of the cylinder 73, and has its rear end connected to the shaft 71 through suitable linkage 76 so that movement of the piston 75 within the cylinder 73 will actuate the linkage 76, the shaft 71, the links 59 and 69, the rods 53 and 63, and thence the lower hitch links 25, so as to move the latter vertically either up or down depending upon the direction of movement of the piston 75 within the cylinder 73. Thus the hitch links 25 may be raised or lowered by the movement of the piston 75 within the cylinder so that the agricultural implement, connected to the links, can either be lowered into engagement with the ground or raised above the ground in a carrying position, in a manner which will hereinafter appear.

A fluid pump 79 is operatively connected to the vehicle power plant 21 so as to be driven thereby. The pressure side of the pump 79 is connected by a suitable conduit 81 to the valve body 83 of a rotor-type valve, generally indicated at 85, and the suction side of the pump 79 is connected by a suitable conduit 87 to the valve body 83. The valve body 83 is sealingly bolted to a side wall of a fluid reservoir tank 90 and communicates with the tank 90 in a manner which will hereinafter appear. The tank 90 is mounted on the vehicle 13, adjacent the driver's seat 14. The cylinder 73 has its forward end, on one side of the piston 75, connected to the valve body 83 through a suitable conduit 89, and the opposite end of the cylinder 73, on the opposite side of the piston 75, is connected to the valve body 83 through a suitable conduit 91, in a manner which will hereinafter appear, so that the piston 75 may be hydraulically actuated by means of fluid delivered by the pump 79 through the rotor-type valve 85. The valve 85 controls the flow of fluid to the cylinder 73 and therefore controls the direction of movement of the piston 75 so that the various operating conditions for the hitch links and the implement connected to the vehicle 13 may be obtained.

Referring now to Figs. 6 through 11, weherein the valve 85 is shown in detail, it will be seen that the conduit 81, from the pressure side of the pump 79, is connected to the valve body 83 by means of a fitting 92 and communicates with a passageway 88 in the valve body. A passageway 94 is provided in the valve body which communicates with the passageway 88 intermediate the ends thereof. The passageway 94 is normally closed by a ball-type pressure relief valve 93. The pressure relief valve 93 is set so as to open at any desired predetermined pressure, such as for example 1400 lbs. per square inch, so that if the fluid pressure in the passageway 88 exceeds 1400 lbs. the pressure relief valve 93 will open. When the valve 93 opens, the fluid in the passageway 94 flows into the fluid reservoir tank 90 through a passageway 95 therein which communicates with the valve body passageway 94 behind the pressure relief valve.

The conduit 87 which is connected to the suction side of the pump 79 is connected to the valve body 83 by means of a suitable fitting 97 and communicates with a passageway 99 in the valve body. The passageway 99 communicates with a passageway 101 which in turn communicates with the lower portion of the fluid reservoir tank 90 so that the fluid therein is drawn from the tank through the valve body passages 101 and 99 and through the conduit 87 into the pump 79. In this way the hydraulic fluid is drawn by the pump 79 from the fluid reservoir tank, through the valve 85, and then is pumped through conduit 81 back into the passageway 88 in the valve body 83.

The conduit 89 which is connected to the front portion of the cylinder 73 is connected to the valve body 83 by means of a suitable fitting 103, and communicates with a valve body passageway 105 which extends into the valve body 83 at substantially right angles to the passageway 88 and which terminates in close proximity to the passageway 88. The conduit 91, which is connected to the rear end of the cylinder 73, is connected to the valve body 83 by means of a suitable fitting 107 and communicates with a passageway 109 therein which extends substantially parallel to the passageway 105. The inner end of the passageway 109 communicates with a passageway 111 which extends at right angles thereto and substantially parallel to the passageway 88. The upper end of the passageway 111 is normally closed by means of a ball-type pressure relief valve 113. The pressure relief valve 113 includes a ball 115, a spring 117, and a threaded plug 119 having a knurled upper end which is disposed above the valve body. By adjusting the threaded plug 119, the value of the spring 117 can be varied so that the "blowoff" pressure of the ball 115 will be varied accordingly. For the purposes of illustration, it will be assumed that the pressure relief valve 113 can be varied so that the ball 115 will "blowoff" between pressure of zero and 500 lbs. per square inch. When the ball 115 is moved off of its seat, the fluid within the passage 111 can flow through a passage 121 into an aligned passageway 123 in the wall of the fluid reservoir tank 90. Thus the fluid from the passageway 111 will be returned to the fluid reservoir tank when the pressure relief valve 113 is opened. In this way the fluid pressure in the passageways 111 and 109, and thus in the rear portion of the cylinder 73, can be varied between predetermined limits, previously set forth by way of example as between zero anl 500 lbs., by adjusting the threaded plug 119.

The valve body 83 is provided with a pair of passageways 125 and 127 which extend transversely through the valve body and have one end thereof communicating with the fluid reservoir tank 90 and the other end thereof communicating with the outer face of the valve body 83, for reasons which will hereinafter appear. The valve body passageway 88 is provided, at the inner end thereof, with a transversely extending passageway 129 which communicates with the outer face of the valve body, and the passageway 111 likewise communicates with the outer face of the valve body through a passageway 131. The passageway 105 in the valve body 83 communicates with the outer face of the valve body through a transversely extending passageway 133. Thus the passageways 88, 111, 105, 125 and 127 all communicate with the outer face of the valve body 83.

A rotor 137 is mounted on the outer face valve body 83. A hollow housing 139 is sealingly secured to the valve body 83 by means of studs 141, and the rotor 137 is rotatably supported within a recess 143 of the housing 139. The inner face of the rotor 137 is held in rotating and sealing engagement with the outer face of the valve body 83 by means of washer-type springs 145 which have their outer or peripheral edges confined between the outer face of the rotor 137 and a shoulder 147 in the hollow interior of the housing 139. The intermediate portion of the leaf springs 145 abuts an annular upstanding rim or flange 149 on the outer face of the rotor 137 and the inner portions of the springs 145 are fixed to an annular ring 151 which is mounted on a shaft 153.

The inner end of the shaft 153 is polygonally shaped and fits into a complemental polygonal recess 155 in the outer face of the rotor 137 so that rotation of the shaft 153 rotates the rotor 137. The intermediate portion of the shaft 153 is sealingly and rotatably mounted in a bore 157 of the housing 139, and the extreme outer end of the shaft 153 is serrated at 159. An operating handle 161 has a serrated aperture 163 adjacent the lower end thereof which is operatively connected to the serrated end 159 of the shaft 153. In this way, when the operating handle 161 is rotated, it rotates the rotor 137.

The inner face of the rotor 137, as can be best seen in Fig. 9, is provided with three circumferentially spaced recesses 165 into which a spring pressed ball detent 167, which is mounted in the outer face of the valve body 83, is adapted to singly fit so that the rotor may be positively adjusted to any one of three positions. The inner face of the rotor 137 is provided with an elongated groove or recess 167 which extends outwardly from the center thereof, and with opposed arcuately elongated grooves 169 and 171, on opposite sides thereof, for reasons which will hereinafter appear. The rotor is provided with passageways 172 therethrough, through which fluid may flow so as to provide a better balanced and more efficiently operable rotor valve structure.

With the valve body and rotor construction heretofore described, the rotor may be rotated to any one of three positions so as to communicate certain of the valve body passageways and openings with certain of the rotor grooves to obtain various valving arrangements.

In operation the hitch links 25 and the implement 29, which is universally connected thereto, may be raised so that the implement will be out of engagement with the ground, by operating the valve hand lever 161, which as can be seen in the drawings is located in close proximity to the vehicle driver seat 14, to what may be termed a first position wherein the groove 171 of the rotor 137 will connect the valve body passageways 88 and 105 and the passageways 111 and 125. In this way the fluid from the pump 79 will be pumped through the passageways 88 and 105 into the conduit 89, and thence into the cylinder 73 so as to move the piston 75 rearwardly and actuate the links 76, 59 and 53, through the piston rod 77, and raise the links 25 and the agricultural implement 29 connected thereto. At the same time the rotor groove 169 connects passageways 111 and 125 so that the fluid on the opposite side of the cylinder 73 will be returned to the fluid reservoir tank through the conduit 91, the valve body passageways 109, 111 and 125.

In order to lock the agricultural implement and the hitch links in this raised position, such as for transportation purposes, the rotor handle 161 is rotated to what may be termed a second position in which the valve body passageway 88 is communicated with the passageway 125 by means of the rotor groove 167. At the same time the valve body passageway 111 is communicated with the valve body passageway 127 by means of the rotor groove 169. In this way fluid is locked in the valve body passageway 105 and thus in the conduit 89 and in the lift side of the cylinder 73 so as to maintain the fluid pressure therein and hold the hitch links 25 and the implement 29 in their raised position. The fluid being pumped from the pump 79 and through the conduit 81, into the passageway 88, will be by-passed to the reservoir tank 90 through the valve body passageway 125, when the pressure in passageway 88 exceeds the set pressure of the relief valve 93. Any fluid in the opposite side of the cylinder 73 will be bled therefrom through the conduit 91, the valve body passageways 109, 111 and 127 back to the tank 90. In this way the agricultural implement will be maintained in a raised position for an indefinite time and will be out of engagement with the ground so that it may be easily transported by the vehicle.

If it is desired to lower the hitch links and agricultural implement 29 and/or apply a downward pressure thereto, the rotor handle 161 is shifted to what may be termed a third position in which the valve body passageway 88 is communicated with the valve body passageway 111 by means of the rotor groove 169. At the same time the valve body passageway 105 is communicated with the valve body passageway 125 by means of the rotor groove 171. Thus the fluid pumped from the pump 79 will pass through the valve body passageway 88 into the valve body passageways 111 and 109, and thence into the cylinder 73 so as to move the piston 75 in the forward direction, and thereby lower the hitch links 25 and the agricultural implement 29.

The fluid pressure applied against the piston 75, so as to move the links and agricultural implement downwardly, may be varied by adjusting the threaded plug 119 so as to vary the value of the pressure relief valve spring 113. With certain types of implements, such as certain cultivators, post hole diggers, power-operated saws and the like, wherein it is desirable to apply a predetermined downward pressure on the implement, the threaded plug 119 may be adjusted so as to vary the pressure at which the valve 113 will open whereby the pressure applied against the piston 75, so as to move the links 25 downwardly, may be varied between the maximum and minimum limits of the pressure relief valve 113. When an agricultural implement, such as the plow 29 illustrated in the drawings is being used, the valve may be arranged so as to provide a fourth position by backing off the threaded plug 119 so that the spring 117 has a zero value, thereby permitting the ball 115 to be unseated by any fluid pressure above zero and causing the fluid in passageways 109 and 111 to be returned to the tank 90 through the passageway 121 in the valve body. Thus the depth of operation of the plow is completely controlled by the depth control mechanism, either the depth control wheel 43 or the adjustable turnbuckle 32 on the upper hitch link, when the valve is adjusted to the above-described fourth position, so that the fluid in the rear portion of the cylinder 73 will be returned to the tank 90 through the conduit 89 and valve body passageways 105 and 125. As the threaded plug 119 has been backed off, no fluid pressure will be transmitted to the opposite side of the cylinder through the passageway 109 and conduit 91. Therefore, there will be no fluid pressure on either side of the piston 75 and the piston may float within the cylinder and permit the hitch links 25 to vertically float with respect to the vehicle to which they are connected so that the depth control mechanism will alone completely control the depth of working of the plow blade 41. In this way, regardless of the relative vertical relationship between the vehicle and the agricultural implement, the implement will plow at a constant depth at all times. That is, even though the vehicle were, for example, at a different elevation than the agricultural implement, or the soil were of varying texture or density, the depth control mechanism would maintain the depth of the working of the plow blade at a constant level.

It will thus be seen that with the hitch connection and implement lift unit of this invention various types of agricultural implements may be connected to a vehicle and may be operated under varying circumstances and under varying conditions with equal efficiency. It furthermore will be appreciated that by providing forwardly converging hitch links 25 an agricultural implement, such as the plow, will follow the steering of the vehicle in a more efficient manner. While the hitch links are universally connected to the vehicle and the implement so as to permit lateral swinging movement of the implement with respect to the vehicle, this movement will be controlled by the forwardly converging hitch links so as to provide as efficient an operating unit as is possible. Furthermore, with this invention, it is possible for the operator of the vehicle to easily control the implement, which is connected to the vehicle, without having to remove himself from his vehicle seat. This invention thus provides a relatively simple, inexpensive and rugged mechanism for use with agricultural implements, by means of which the optimum in operating efficiency is obtained.

We claim:

1. An adjustable control valve for a power operated unit including a valve body, a first passageway in said valve body connectable to the pressure side of a pump, a pressure relief valve operatively connected with said first passageway to maintain a predetermined pressure in said first passageway, a second passageway in said valve body connectable to one end of a cylinder, a third passageway in said valve body connectable to the opposite end of the cylinder, an adjustable pressure relief valve operatively connected with said third passageway for the maintenance of a predetermined pressure in said third passageway, fourth and fifth passageways in said valve body connectable to a fluid reservoir tank, a sixth passageway in said valve body connectable to the fluid reservoir tank and to the suction side of a pump, a rotor rotatably mounted on said valve body and having a plurality of grooves in one face thereof adapted to connect certain of said valve body passageways for causing various operations of the power unit, means for releasably retaining said rotor in a predetermined setting with respect to said valve body, and means for rotating said rotor with respect to said valve body whereby in one setting said first passageway is connected with said second passageway while said third passageway is connected with said fourth passageway, in a second setting wherein said third passageway is connected with said first passageway while said second passageway is connected with said fourth passageway, in a third setting wherein said first passageway is connected with said fourth passageway so that fluid pressure is locked in said second passageway while at the same time said third passageway is connected with said fifth passageway, and in a fourth setting wherein said second passageway is connected with said fourth passageway while said first passageway is connected with said third passageway and said adjustable relief valve is adjusted so as to maintain a zero fluid pressure in said third passageway.

2. An adjustable control valve for use in a power operated unit; including a valve body, a first passageway in said body adapted to be connected to the pressure side of a fluid pump, a pressure relief valve operatively connected to said first passageway to maintain a predetermined pressure therein, a second passageway adapted to be connected to a cylinder, a third passageway adapted to be connected to a second cylinder or to the opposite end of the first cylinder, an adjustable pressure relief valve operatively connected to said third passageway for the maintenance of a predetermined pressure therein, a fourth passageway in said valve body adapted for use in discharging fluid from said valve body to a fluid reservoir tank, a fifth passageway in said valve body adapted to be connected to the fluid reservoir tank and to the suction side of the pump to which the first passageway is adapted to be connected, a rotor rotatably connected to said valve body and having a plurality of passageways therein adapted to connect certain of said valve body passageways for permitting various operating conditions to be obtained with the use of said valve, means for releasably retaining said rotor in a predetermined setting with respect to said valve body, and means for rotating said rotor with respect to said valve body whereby in one setting said first passageway is connected with said second passageway while said third passageway is connected with said fourth passageway, in a second setting wherein said third passageway is connected with said first passageway and said adjustable pressure relief valve while said second passageway is connected with said fourth passageway, in a third setting wherein said first passageway is connected with said fourth passageway so that fluid pressure may be locked in said second passageway while said third passageway may be set for a zero fluid pressure by adjusting said pressure relief valve, and in a fourth setting wherein said second passageway is connected with said fourth passageway and said first passageway is connected with said third passageway and said adjustable pressure relief valve is set to maintain a zero fluid pressure in said third passageway so that both said second and third passageways are free of fluid pressure.

C. JOSEPH SMITH.
WILLIAM ESDALE.

References Cited in the file of this patent

UNITED STATES PATENTS

| Number | Name | Date |
|---|---|---|
| Re. 22,627 | McKay | May 26, 1941 |
| 1,764,963 | Laster | June 17, 1930 |
| 1,791,013 | Rudolph | Feb. 3, 1931 |
| 1,808,759 | Bickerton | June 9, 1931 |
| 1,912,184 | Ferris et al. | May 30, 1933 |
| 1,929,804 | Brown | Oct. 10, 1933 |
| 2,039,316 | Johnston | May 5, 1936 |
| 2,111,169 | Clark | Mar. 15, 1938 |
| 2,198,196 | Goldup | Apr. 23, 1940 |
| 2,360,987 | Temple | Oct. 24, 1944 |
| 2,403,360 | Graham | July 2, 1946 |
| 2,445,145 | Love | July 13, 1948 |
| 2,477,669 | Stephens | Aug. 2, 1949 |